(12) United States Patent
Copperman et al.

(10) Patent No.: US 6,665,490 B2
(45) Date of Patent: Dec. 16, 2003

(54) OBTAINING AND USING DATA ASSOCIATING ANNOTATING ACTIVITIES WITH PORTIONS OF RECORDINGS

(75) Inventors: Max Copperman, Santa Cruz, CA (US); Marc Dymetman, Grenoble (FR)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/276,532

(22) Filed: Mar. 25, 1999

(65) Prior Publication Data

US 2003/0190145 A1 Oct. 9, 2003

Related U.S. Application Data

(63) Continuation-in-part of application No. PCT/US98/20593, filed on Sep. 30, 1998.

(51) Int. Cl.[7] .............................. H04N 7/00; H04N 7/52; H04N 5/91; H04N 7/04; H04N 7/06; H04N 7/08
(52) U.S. Cl. ......................................... 386/95; 386/46
(58) Field of Search ........................ 386/38, 45, 69–70, 386/83, 107, 117; 358/906, 909.1; 348/231.3, 239

(56) References Cited

U.S. PATENT DOCUMENTS

| 5,128,525 A |   | 7/1992 | Stearns et al. ............... 235/454 |
| 5,486,686 A |   | 1/1996 | Zdybel, Jr. et al. .......... 235/375 |
| 5,535,063 A |   | 7/1996 | Lamming ....................... 360/4 |
| 5,613,032 A | * | 3/1997 | Cruz et al. .................. 360/72.1 |
| 5,637,871 A | * | 6/1997 | Piety et al. .................. 250/330 |
| 5,713,021 A | * | 1/1998 | Kondo et al. ................ 345/723 |
| 5,926,605 A | * | 7/1999 | Ichimura .................... 360/72.1 |

FOREIGN PATENT DOCUMENTS

| EP | 0 469 864 A2 | 2/1992 |
| EP | 0 622 722 A2 | 11/1994 |
| EP | 0 840 199 A2 | 5/1998 |

* cited by examiner

Primary Examiner—Thai Tran
Assistant Examiner—Polin Chieu

(57) ABSTRACT

Annotating activities are associated with portions of recordings by activity/recording data such as a table in which annotation identifiers are paired with timestamps. To obtain activity/recording data, an image input device, such as a manually positionable scanner or a fixed position camera, can produce an image signal set with information about a manual annotating activity and a recording/playback device can provide a recording portion signal, such as a timestamp, with information about a portion of a recording. The image signal set and the recording portion signal can then be used to automatically obtain the activity/recording data, associating information about the manual annotating activity with information identifying the portion of the recording. The information about the manual annotating activity can be an annotation identifier that includes information about the position or shape of the annotation. The activity/recording data can also include, for each annotation identifier, an image of the annotation. Activity/recording data can be used to playback a portion of a recording. Another image signal set can be obtained with information about a manual request activity, for example, and if the manual request activity is sufficiently similar to a manual annotating activity, the associated portion can be played back. Or a user can provide a selection signal indicating one of the annotations to obtain playback of the associated portion of the recording. If the annotating activity was performed with a keyboard or other user input device, the annotations can be printed, and the user can use a hand-held scanner to select an annotation to obtaining playback.

23 Claims, 10 Drawing Sheets

OBTAINING AND USING DATA ASSOCIATING ANNOTATING ACTIVITIES WITH PORTIONS OF RECORDINGS

This application is a CIP and claims priority under 35 U.S.C. §120 from copending International Application PCT/US98/20593, filed Sep. 30, 1998, with respect to all shared subject matter.

FIELD OF THE INVENTION

The present invention relates to techniques for obtaining and using data that associate annotating activities with portions of recordings.

BACKGROUND OF THE INVENTION

U.S. Pat. No. 5,535,063 discloses a notetaking system based on a notepad computer with an integrated audio/video recorder, whereby a document is created or retrieved. As the user types on the computer's keyboard or writes with a stylus on a touchscreen, each character or stroke that is input by the user is invisibly time-stamped by the computer. The audio/video stream is continuously time-stamped during recording. To play a section of the recording back, the user selects part of the note and invokes a "playback selection" command. The computer then examines the time-stamp and winds the records to the corresponding place in the audio/video recording, where it starts playing, so that the user hears and/or sees what was being recorded at the instant the selected text or strokes were input.

Whittaker, S., Hyland, P., and Wiley, M., "Filochat: Handwritten Notes Provide Access to Recorded Conversations", *Human Factors in Computing Systems, CHI '94 Conference Proceedings*, ACM, 1994, pp. 271–277, describe a semi-portable device that integrates handwriting and recorded audio using a write-on tablet connected to a PC. It allows users to access particular points in recorded speech via handwritten notes using temporal indexing. The system co-indexes notes and recorded speech. Users could later identify what was said about a particular topic by selecting a seek option on an audio menu and then gesturing at the part of their notes taken at the time the topic was discussed; the system would play back what was said at the exact time that the original notes were taken.

Stifelman, L. J., "Augmenting Real-World Objects: A Paper-Based Audio Notebook", in *CHI '96 Companion*, ACM, 1996, pp. 199–200, describes techniques for capture and access of audio recordings via notes taken on paper placed on top of a digitizing tablet.

SUMMARY OF THE INVENTION

The invention addresses problems that arise in notetaking systems and similar systems that obtain and use data associating notetaking or other manual annotating activities with portions of a recording.

Conventional systems like that described in U.S. Pat. No. 5,535,063 and the article by Whittaker et al. rely on the use of a dedicated computer with a touchscreen, write-on tablet, or other input device that both captures information about the user's notes at the time of recording and displays indicia of the notes for selection by the user in a playback mode. The systems require a file to be created or retrieved before a user can start making notes in it or continue making notes in an already existing electronic document. By considering an example—a user being handed a set of papers accompanying a talk or in a meeting—it can be seen that the user cannot, using such a system, mark notes on the paper he or she has just been given, but must break off from the meeting, create a new file or electronic document and set this up displayed on the screen of a computer so that notes can be captured and recorded.

In this and other situations, it is inconvenient to stop and create or retrieve an electronic file or document before beginning notetaking or other manual annotating activity or before beginning playback of a portion of a recording associated with an annotating activity.

The invention alleviates this inconvenience and the problems that cause it by providing techniques that make it possible for a user to begin notetaking or other manual annotating activity associated with a portion of a recording or to begin playback of a portion of a recording associated with an annotating activity without stopping until an electronic file or document can be created or retrieved.

Some of the techniques use an image input device to obtain an image signal set defining a set of one or more images that include information about a manual annotating activity that occurs during a period of time within which a portion of a recording is made or played. The techniques also obtain information about the portion of the recording from a recording/playback device. The techniques use the image signal set and the recording portion signal to automatically obtain activity/recording data associating information about the manual annotating activity with information identifying the portion of the recording. The use of images in this manner makes it unnecessary to stop before notetaking as in the conventional techniques. The manual annotating activity can be performed on a marking medium, and can be identified by position data or shape feature data obtained from the image signal set in various ways. The activity/recording data can include a pair of data items, one an identifier of the annotating activity and the other an identifier of the portion of the recording, such as a timestamp obtained in response to a user selection.

Other techniques provide a system that includes recording/playback circuitry, image input circuitry, and processing circuitry that obtains activity/recording data as described above. In addition, the system can be used to replay a portion of the recording, such as in response to information about a similar annotating activity. Such information may be obtained from an image signal set or from signals from user selection circuitry for selecting annotations.

Yet other techniques are playback techniques that use image input circuitry to obtain an image signal set defining a set of one or more images that include information about a manual activity relating to a marking medium. Here again, the use of images in this manner makes it unnecessary to stop before requesting playback as in the conventional techniques. If the annotating activity, whether manual or otherwise, produced information about the annotating activity similar to that described above, playback can be requested with a similar manual activity. In other cases, playback can be manually requested using a printed version of text or annotations produced by the. annotating activity. For example, if text annotations were entered by keyboard, the recording associated with one of the annotations can be played back by manually scanning the printed version of that annotation and performing optical character recognition (OCR) to obtain an identifier of the annotation. Or, identifying markings can be printed with each annotation, and the recording associated with one of the annotations can be played back by manually scanning the annotation's identifying markings.

The techniques may be implemented in a system for taking notes on paper during a recording (typically audio or video) and for using manual activity on paper as an index to control playback of the recording. In addition to using paper both for annotation and playback, the techniques may be implemented to allow the user to take notes on paper and control playback with an electronic device, or to take notes using an electronic device and control playback with a paper version of the notes.

The techniques can also be implemented in ways that allow the user to make a note on paper with a combined pen/camera or with pen or pencil. If notes are made with pen or pencil, they can either be subsequently scanned or can be written under a camera. An identifying feature of the note can be computed from input images. The feature can be stored in a table with the current timestamp of the recording. This process may be repeated for other notes. A note may be subsequently selected to request playback. Its identifying feature can be computed and matched against the set of stored features and the timestamp associated with the matching feature can be used to play back the associated portion of the recording.

Some of the techniques can be implemented with substrates, e.g. paper, or documents produced therefrom, that include visible or invisible coded markings identifying the substrate and locations or zones within it. The markings can be Xerox DataGlyphs, described, for example, in U.S. Pat. No. 5,128,525, incorporated herein by reference.

An advantage is that the invention allows handwritten notes on standard paper or other conventional media to index and control playback of recordings.

The following description, the drawings, and the claims further set forth these and other aspects, objects, features, and advantages of the invention.

DETAILED DESCRIPTION

Figure 1:
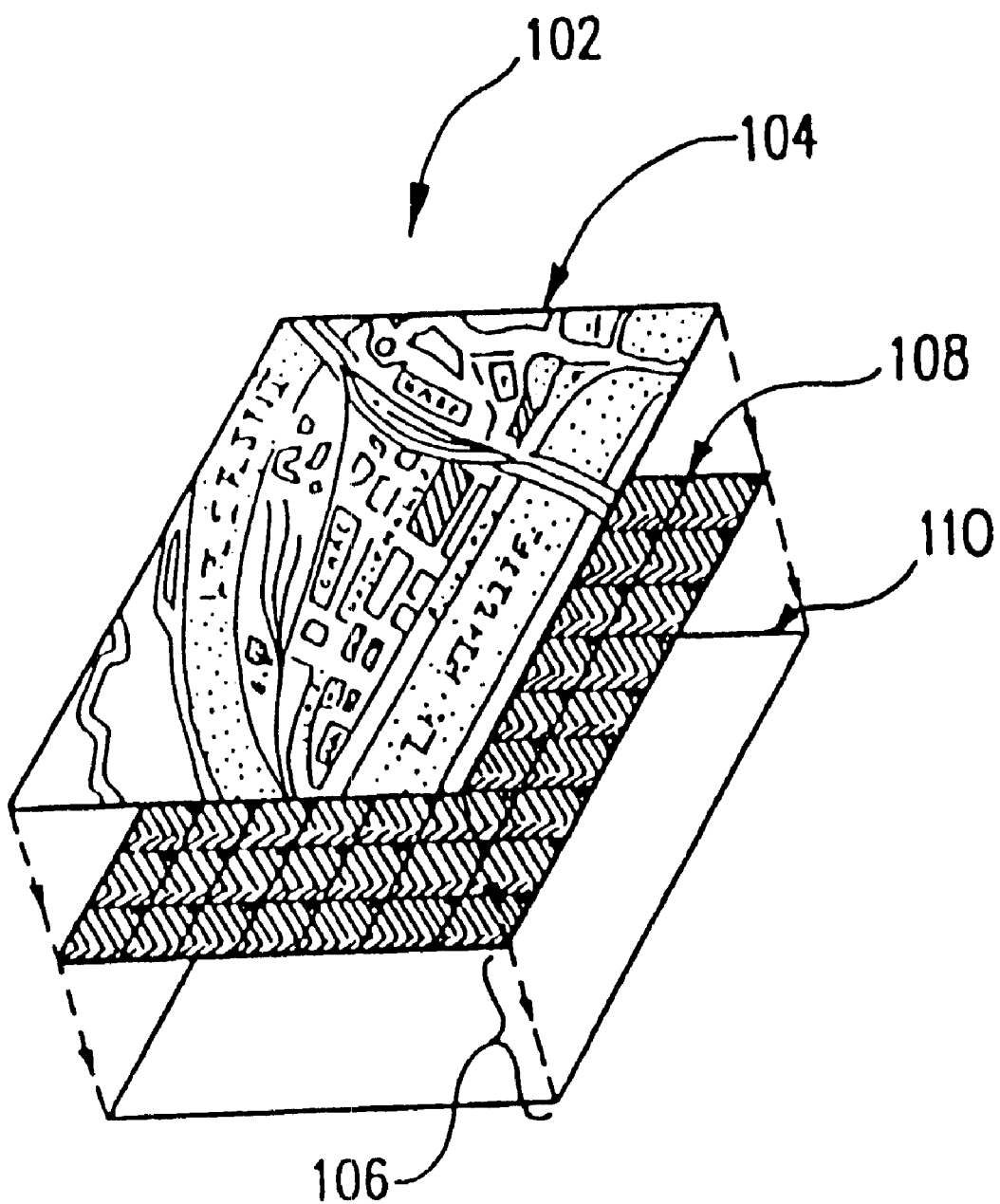
FIG. 1 illustrates components of a document printed on a coded substrate.

The following definitions are helpful in understanding the broad scope of the invention, and the terms defined below have the indicated meanings throughout this application, including the claims.

A "processor" or "processing circuitry" is a component that responds to input signals by performing processing operations on data and by providing output signals. The input signals may, for example, include instructions, although not all processors receive instructions. The input signals to a processor may include input data for the processor's operations. The output signals similarly may include output data resulting from the processor's operations. A processor or processing circuitry may include one or more central processing units or other processing components.

A processor or processing circuitry performs an operation or a function "automatically" when it performs the operation or function independent of concurrent human intervention or control.

Any two components are "connected" when there is a combination of circuitry that can transfer signals from one of the components to the other. For example, two components are "connected" by any combination of connections between them that permits transfer of signals from one of the components to the other.

An operation or event "transfers" an item of data from a first component to a second if the result of the operation or event is that an item of data in the second component is the same as an item of data that was in the first component prior to the operation or event. The first component "provides" the data, and the second component "receives" or "obtains" the data.

A processor "accesses" an item of data in memory by any operation that retrieves or modifies the item or information within the item, such as by reading or writing a location in memory that includes the item.

A processor or other component of circuitry "uses" an item of data in performing an operation when the result of the operation depends on the value of the item. For example, the operation could use the item to access another item of data.

An item of data "indicates" a thing, event, or characteristic when the item has a value that depends on the existence or occurrence of the thing, event, or characteristic or on a measure of the thing, event, or characteristic. An item of data "indicates" another value when the item's value is equal to or depends on the other value.

An item of data "identifies" or "is an identifier of" one of a set of identifiable items if the item of data is one of a set of items of data, each of which can be mapped to at most one of the identifiable items. For example, an "annotation identifier" is an item of data with a value that can be mapped to at most one of a set of annotations.

The term "image" is used herein to mean a pattern of light, whether within or outside the visible range.

Signals "define" an image when the signals include sufficient information to produce the image. "Image input circuitry" is circuitry for obtaining data defining images as input.

A "recording" is information stored over time that can be replayed over time. The information can be stored in any appropriate analog or digital form, and can indicate sound, images, or any other time-varying parameter. A "recording/playback device" or "recording/playback circuitry" is a device or circuitry that can make a recording or play a recording or that can perform both functions.

A "marking medium" is a physical medium on which a pattern of marks can be produced, such as by marking or printing actions. Common examples of marking media include sheets of paper and plastic. As used herein, "marking" or "mark" includes both visible and invisible marks, and includes a single mark and also plural marks that together form a pattern of marks.

An activity is performed "on" a marking medium when the activity is performed in close proximity to the marking medium and the activity refers to the marking medium. Examples would include making marks on the marking medium, scanning the marking medium, or pointing to a part of the marking medium.

An "annotating activity" is an activity that produces notes or other items of information that relate to another body of information, such as a recording or a document. A "manual annotating activity" is an annotating activity performed by hand, such as with a pen or pencil on paper.

A "similarity criterion" is a criterion that can be applied to determine whether two items are similar. Items that meet or satisfy a similarity criterion may be said to "match".

1. General Features

Some implementations of the invention concern techniques in which annotations such as notes taken on paper during a recording (or during playback of a recording) can be used as indices into the recording for controlling playback. Two techniques for obtaining annotation identifiers are described below, one in which the position of an annotation is used to identify it, and one in which the shape of an annotation identifies it.

In another implementation, annotations such as notes are taken using an electronic device such as a keyboard or palmtop computer, and are printed so that a user can control playback using the printed annotations. In yet another implementation, annotations such as notes are taken on paper and a user can control playback through an electronic device.

2. Paper Annotation and Retrieval

In the following implementations, annotation can be performed during a recording session, or while a recording is being played, with the user taking notes on paper.

For each note, a system can store some identifying feature of the note with the time-stamp of the recording as of the moment the note was taken.

Selection and retrieval, in which a user controls playback of a recording, can similarly begin with the user selecting a note from the paper. In response, the system can determine an identifying feature of the note, look it up among those it has stored, and retrieve the associated timestamp. The system can then use the timestamp to play the recording starting at the position identified by the timestamp.

Figure 7:
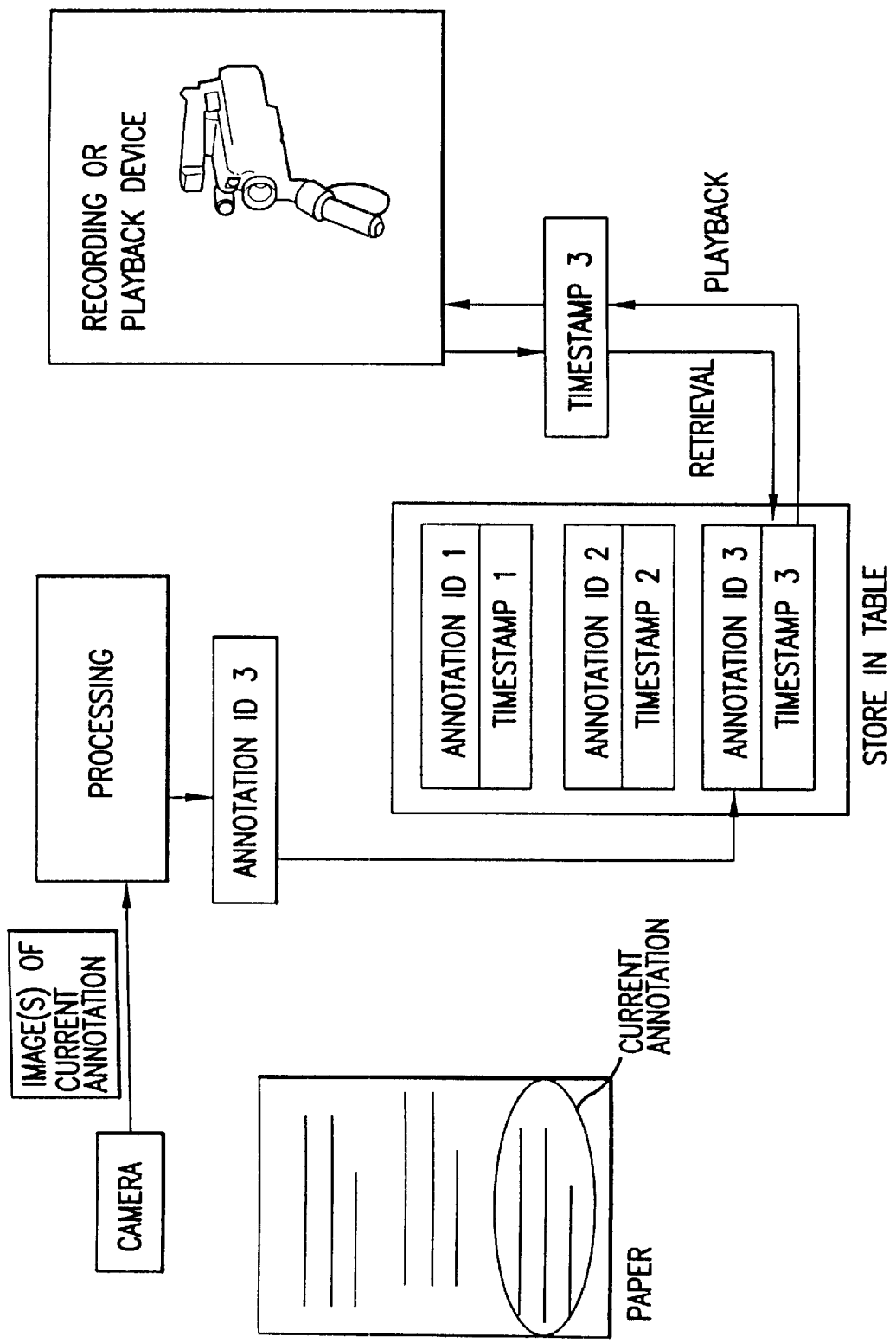
FIG. 7 is a schematic overview of a system for indexing recordings.

A system in which the invention can be implemented is shown in FIG. 7. As shown, a person can perform manual annotating activity by taking notes on a sheet of paper during a recording session or playback of a recording in order to indexing the recording, or can manually select a note in order to control playback of an indexed recording.

A camera or other image input circuitry receives an image of the paper and converts it to image signals defining one or more images of the part of the paper that includes the current annotation. The image signals are provided to processing circuitry, which uses the image signals to obtain an annotation identifier (ID). FIG. 7 illustrates one annotation ID, labeled "Annotation ID 3", which has been produced by the processing circuitry during indexing. The system also includes a recording or playback device or circuitry, illustratively a video recorder with playback capabilities, which can produce a current timestamp during a recording session or playback of a recording when indexing the recording, or can respond to a timestamp by playing back the recording beginning at the timestamp, when playback is being controlled, such as by the processing circuitry. In FIG. 7, a timestamp, labeled "Timestamp 3", which has either been provided by processing circuitry to obtain playback or has been provided by the recording or playback device for possible use in indexing.

FIG. 7 also illustrates a table that can be stored in memory and accessed by the processing circuitry. The illustrated table includes pairs, each consisting of an annotation ID and a timestamp. The pairs can be stored by the processing circuitry during indexing or can be looked up by the processing circuitry during control of playback.

The invention could be implemented with a button operable by the user. She could click it to signal that she is starting an annotation. The timestamp of the recording at the time when she clicks can be associated with the annotation ID of the new annotation by storing them in a pair in the table. The user is likely to click in reaction to an interesting event in the recording session. There will be a lag due to her reaction time, so when she subsequently selects the new annotation to view the associated portion of the recording, she will probably want to start playback of the video recording at a point prior to the timestamp associated with the new annotation's ID. The processing circuitry can provide a parameter to let the user adjust the offset between actual playback and the timestamp retrieved from the table. When the user is done, she could signal that the annotation is completed by clicking again.

Alternatively, the processing circuitry could, in some implementations, automatically detect the beginning and ending of an annotation by applying appropriate criteria to image signals from the camera or to signals from other input devices.

2.1 Identifying Annotations by Position

In some implementations, the identifying feature of an annotation is its position on a page. The processing circuitry can obtain position data indicating position of the marks the user makes on the page from the image signals. The position data could, for example, define a region that bounds the entire annotation. The annotation ID stored with the timestamp can include the position data.

During playback, a user can select a note on the page by pointing at the note or at some part of it. The processing circuitry can similarly obtain position data indicating the pointed-at position, and this position can be compared with the position data in the table to find a pair whose position data meets an appropriate criterion of similarity, such as being within some stored distance from the pointed-at position. The timestamp of the pair with the similar position can then be retrieved for use in playback.

The processing circuitry can obtain position data from image signals in various ways. In some of the implementations described below, coded substrates provide information about position, while in others information about position is obtained in other ways.

2.1.1 Coded Substrates

Some implementations use substrates bearing encoded identifiers. Examples of such identifiers are described in coassigned U.S. Pat. No. 6,330,976, entitled "Marking Medium Area With Encoded Identifier for Producing Action Through Network", incorporated herein by reference. As described there, a substrate, such as a sheet or sticker of paper or a document, can bear visible or invisible markings that encode an Identifier of the substrate and, in some cases, can also encode locations or zones within the substrate. The markings can, for example, be Xerox DataGlyphs. Such substrates are referred to hereinafter as "coded substrates".

FIG. 1 illustrates components of a document printed on a coded substrate. Printed document 102 comprises layer 104 of printed visible (human-readable) information printed on coded substrated 106, illustratively a segment of a map though layer 104 could include text, photographic images, or any other human-readable information. Coded substrate 106 in turn comprises a layer 108 of visible or invisible machine readable markings printed on a sheet medium 110 (e.g. paper).

Figure 2:
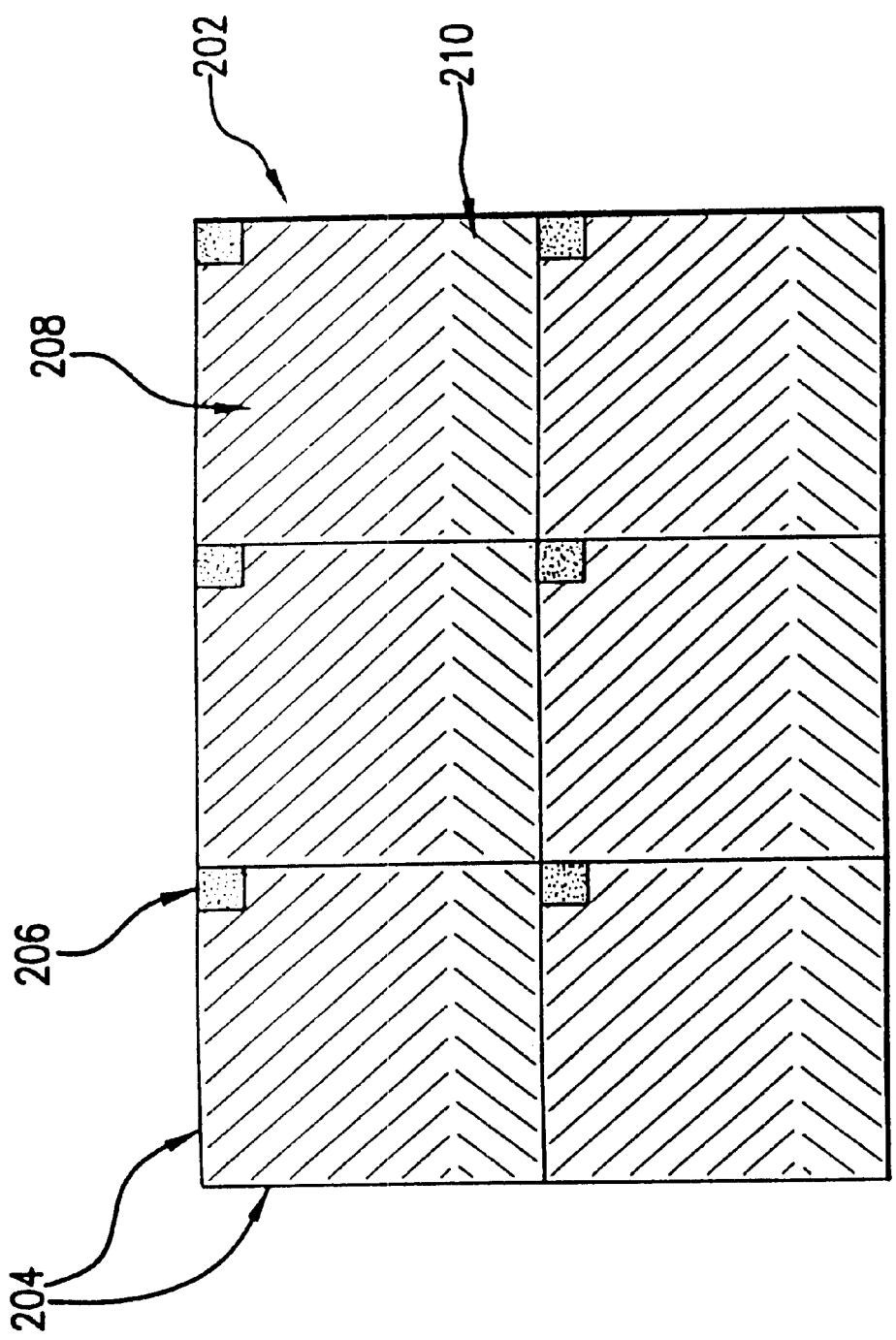
FIG. 2 shows schematically a sample of zones, and the disposition of machine readable markings, on a coded substrate.

FIG. 2 shows a sample of zones or cells, and the disposition of machine readable markings, on a coded substrate, as could be printed in layer 108. Each zone or cell 202 includes a border 204 around its interior and an orientation marker 206, which can be within the interior. A first set of markings 208 over part of the interior zone or cell 202 is an encoded representation of a page identifier (pid), i.e. an item of data whose value uniquely identifies the page, while a second set of markings 210 over a possibly smaller part of the interior of zone or cell 202 is an encoded representation of the localization (page-loc)—uniquely defining the position of zone or cell 202 within the page.

Figure 3:
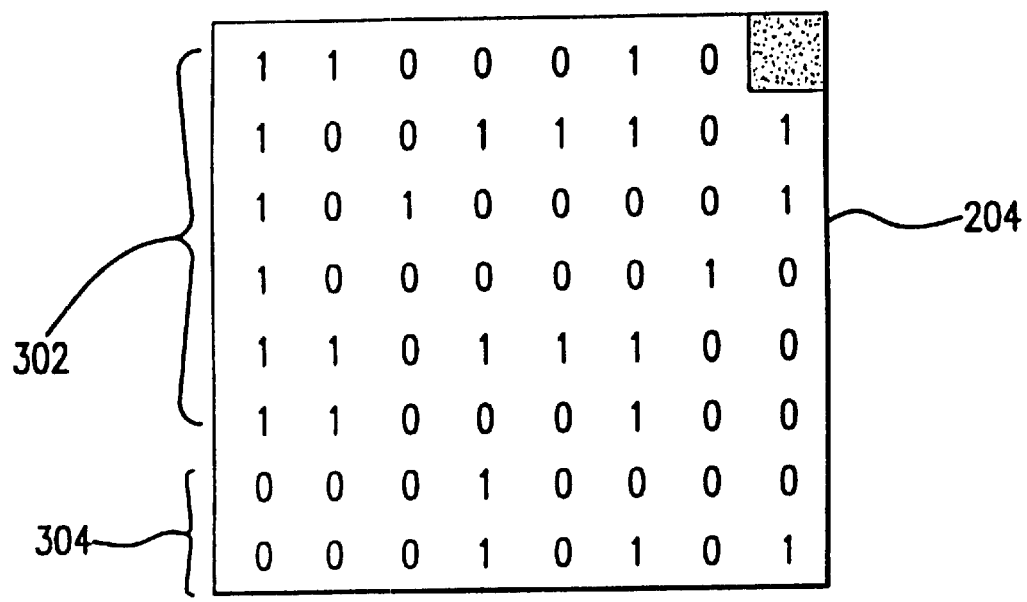
FIGS. 3 and 4 show how digital data can be encoded in markings printed in a zone of the type illustrated in FIG. 2.
Figure 4:
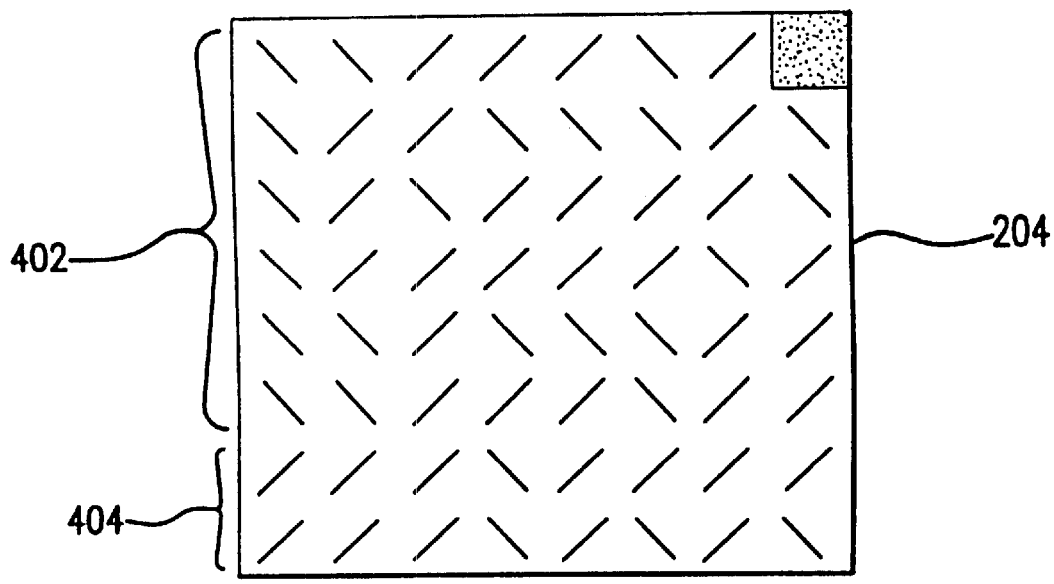

FIGS. 3 and 4 show how digital data can be encoded in a single zone or cell like those illustrated in FIG. 2. FIG. 3 shows the unencoded binary data with each binary value or bit in approximately the position of its encoded representation, i.e. 47 bits of pid in the upper section 302 (the bit stream wraps at border 204), and 16 bits of page localization data (loc) in the lower section 304. The pid code denotes 108429159095492 (decimal)=629DA182DCC4 (hexadecimal)=11000101001110110100001100000101101110011000100000100000010101 (binary, to make the wrapping explicit). In the 16 bit loc code in section 304, there are 8 bits for the X coordinate and 8 bits for the Y coordinate. Thus, for the cell (zone) shown, its position is (16, 21) on the substrate.

FIG. 4 shows the same data as in FIG. 3, but represented by DataGlyph markings. Encoding using DataGlyphs and the retrieval of data therefrom is discussed further in U.S. Pat. No. 5,486,686, EP-A-469864, and coassigned U.S. Pat. No. 6,330,976, entitled "Marking Medium Area With Encoded Identifier for Producing Action Through Network", all incorporated herein by reference. Here, a first set of glyphs (markings) in upper section 402 encodes a pid and a second set in lower section 404 encodes a loc. Each glyph encodes the bit at approximately the same position in FIG. 3, so that each glyph extending from upper left to lower right encodes a "1" and each glyph extending from lower left to upper right encodes a "0".

Figure 5:
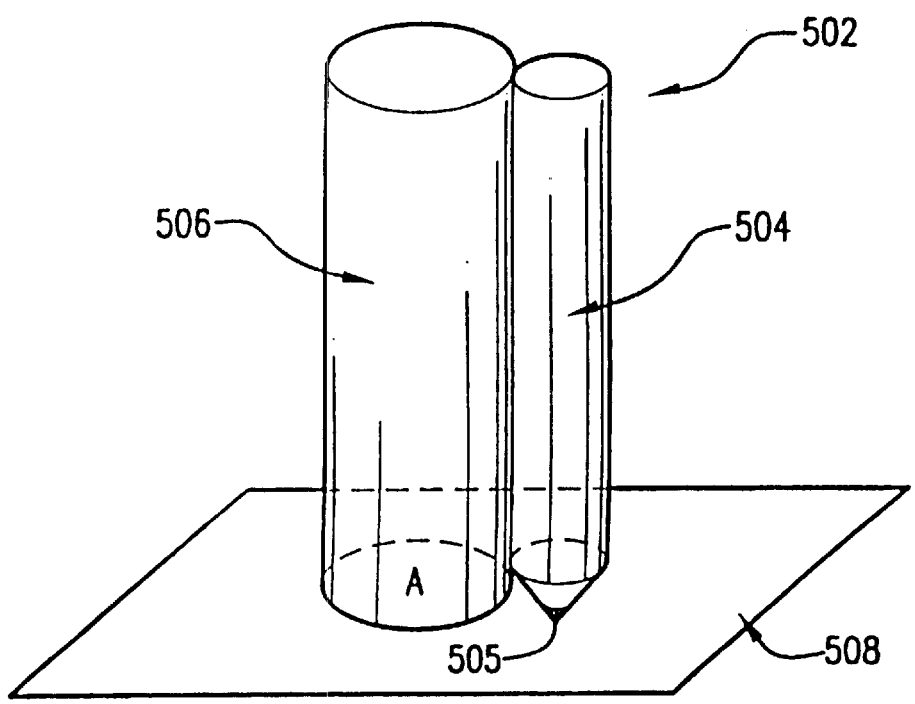
FIG. 5 schematically illustrates features of a pointer.

FIG. 5 schematically illustrates features of a pointer that may be used in implementing the invention. Other examples of image input devices that could be used are described in coassigned U.S. Pat. No. 6,310,988, entitled "Methods and Apparatus for Camera Pen"; U.S. Pat. No. 6,327,395, entitled "Glyph Address Carpet Methods and Apparatus for Providing Location Information in a Multidimensional Address Space"; and U.S. patent application Ser. No. 09/233,882, entitled "Multi-level Selection Methods and Apparatus Using Context Identification for Embedded Data Graphical User Interfaces", all incorporated herein by reference.

Pointer 502 comprises pointing device 504, which may have tip 505, and image capture device 506, which can be a camera or another type of image input circuitry. In use, image capture device 506 is able to capture images of an area A of a document 508, which can be implemented with a coded substrate as illustrated in FIGS. 1–4. For the sake of illustration, the sizes of the components of pointer 502 are exaggerated, and pointing device 504 is shown parallel to image capture device 506 although they could be differently oriented—e.g. in practice, area A may be much closer to tip 505 of pointing device 504 than appears in FIG. 5, so that a user can more easily determine from tip 505 where area A is located. In certain implementations, pointing device 504 may be omitted. In others, pointing device 504 may also be a pen or any other marking device suitable for making marks that are visible to a user on a coded substrate.

Document 508 may be a blank coded substrate, or such a substrate having human-readable information printed thereon.

Figure 6:
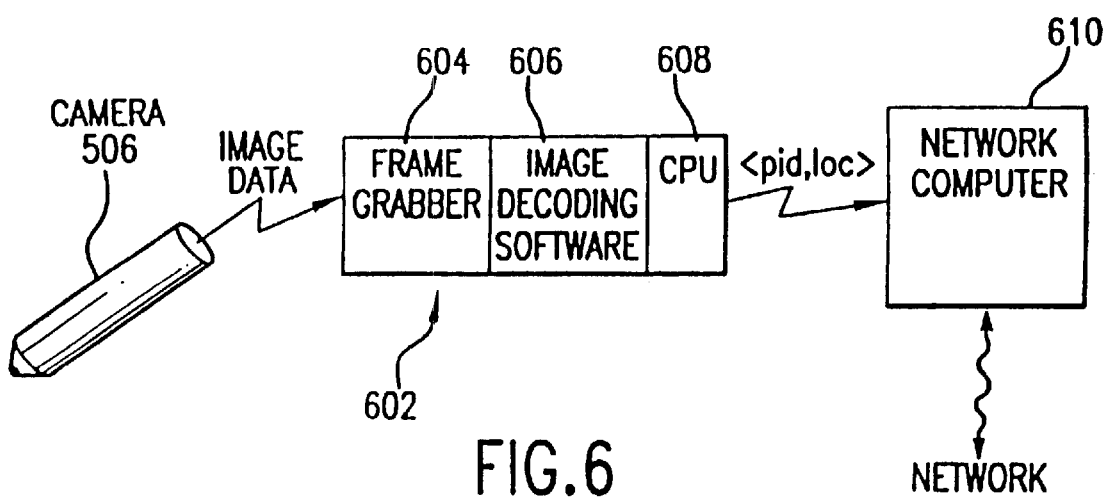
FIG. 6 shows schematically a configuration for passing page identification codes and/or page location codes from the pointer of FIG. 5 to a network computer.

FIG. 6 shows a configuration for passing page identification codes and/or page location codes from image input circuitry as in pointer 502 in FIG. 5 to processing circuitry that includes a network computer. Image capture device 506, illustratively a CCD or other appropriate camera, is coupled by wired or wireless (e.g. IR or RF) link to processing device 602 and in use provides a signal with image data defining captured images to processing device 602. Image capture device 506 and processing device 602 may be combined into a single handheld unit or may be separate components.

The operative elements of processing device 602 include a frame grabber circuit 604, image decoding software 606, and CPU 608, which are known in the art. CPU 608 can execute image decoding software 606 and other conventional software to receive and decode an image from frame grabber circuit 604 and to provide decoded data to other components as described below. Processing device 602 can also include memory, accessible by CPU 608 for storage and retrieval of data.

In use, processing device 602 extracts from the image data the encoded page identifier and page-location data to obtain an item of data (<pid, loc>) and communicates the item of data in a wired or wireless fashion to a local device, illustratively network computer 610 linked to a network such as an intranet or the internet in a known manner. Computer 610 can have its own unique network address, but need not have any information output device like a display screen or printer, because such a device is not necessary to perform the function of providing a connection between CPU 608 and the network. Processing device 602 and computer 610 could therefore both be within pointer 502, and could communicate and share resources through any appropriate circuitry. Computer 610 could, however, perform other functions, in which case it could have a user interface appropriate for those functions.

A user can write on a coded substrate such as document 508 with pointer 502 or some other hand-held pen/camera combination.

As the user writes, the positions of the pointer while it is in contact with the page can be recovered by CPU 608 executing image decoding software 606 and operating on image signals from the camera. The DataGlyphs or other markings on the page encode loc codes or other position identifiers which CPU 608 can obtain.

The user can alternatively select an annotation by clicking the pointer on some part of the annotation. The camera provides an image signal showing encoded markings in the clicked part of the annotation, and CPU 608 can similarly obtain a position identifier for the position of the pointer. In an implementation using a coded substrate, the annotation/playback application can be automatically launched when a user clicks on a page of coded substrate, and can automatically locate the table with pairs of annotation IDs and timestamps for the page, wherever it is stored.

Figure 8:
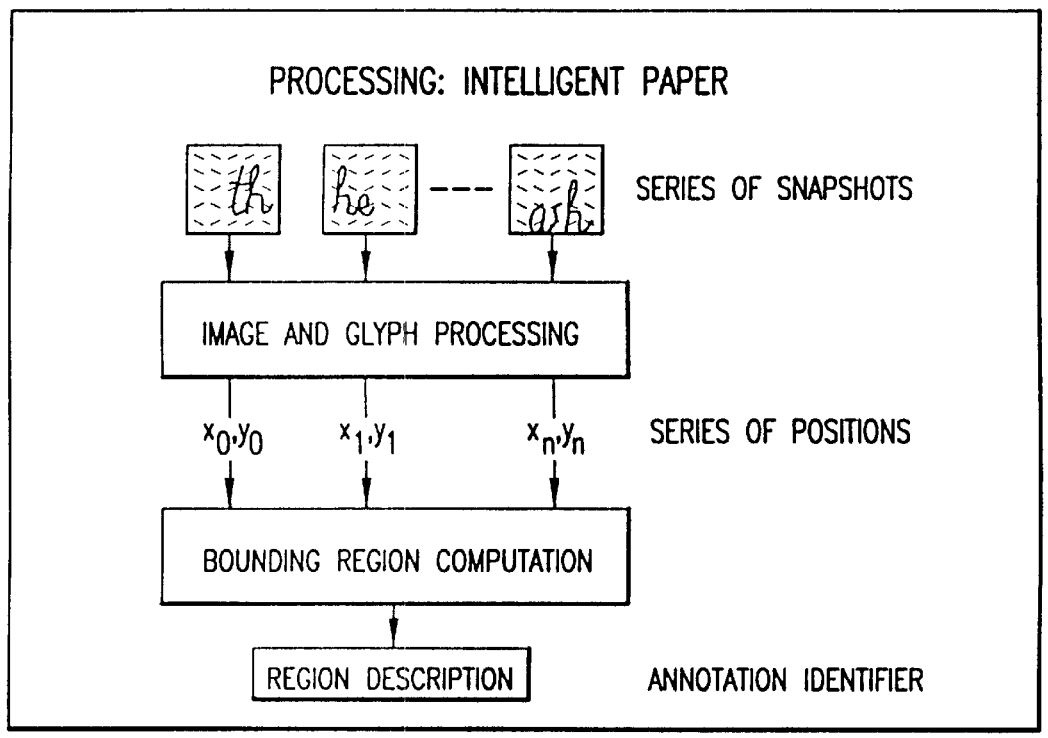
FIG. 8 is a schematic illustration of one way a position-based annotation identifier can be obtained in the system of FIG. 7.

FIG. 8 shows an example of operations that can be performed by the processing circuitry of FIG. 7 in obtaining an annotation ID. The camera provides an image signal set defining a series of images of a coded substrate, referred to as snapshots in FIG. 8. The processing circuitry can perform conventional image processing and glyph processing to obtain position identifiers identifying a series of positions on the coded substrate. The processing circuitry can then perform a conventional bounding region computation to obtain a region description of a region that includes all the positions, such as a description of a bounding rectangle, which serves as an annotation ID.

The annotation ID obtained as in FIG. 8 can be associated with a timestamp in a table or can be used for playback by finding a matching annotation ID in the table and by then using the associated timestamp to cause playback of a portion of the recording.

2.1.2 Under the Camera

In the coded substrate implementations described above, the image input circuitry is a camera in a hand-held device. In contrast, EP-A-622,722 and EP-A-840,199, incorporated herein by reference, describe systems in which the image input circuitry is a camera in a fixed position over a desk. The invention can also be implemented using a camera in a fixed position.

In a fixed camera implementation, the user can annotate a page or sheet of paper with pen or pencil. The page can be within the field of view of the camera, and can have registration marks on it that allow distinct images of it to be registered properly with each other in case the page is moved. The page may also have identification marks to distinguish it from other pages or sheets of paper.

The camera can provide an image signal set defining images of the entire page, which can, for example, be unobscured immediately before and after the annotation is made or, if obscured, can be scanned in parts or in another appropriate way to obtain a complete image. The last image of the page taken before the annotation is made can be subtracted from the first image taken after, isolating the marks in the annotation. The positions of the marks relative to the page frame can then be recovered.

The user can alternatively select an annotation by pointing at some part of the annotation. The position to which the user is pointing can be recognized by the processing circuitry by performing image processing, such as with techniques described in EP-A-622,722 and EP-A-840,199.

In either of these cases, the annotation ID can be data identifying position.

Figure 9:
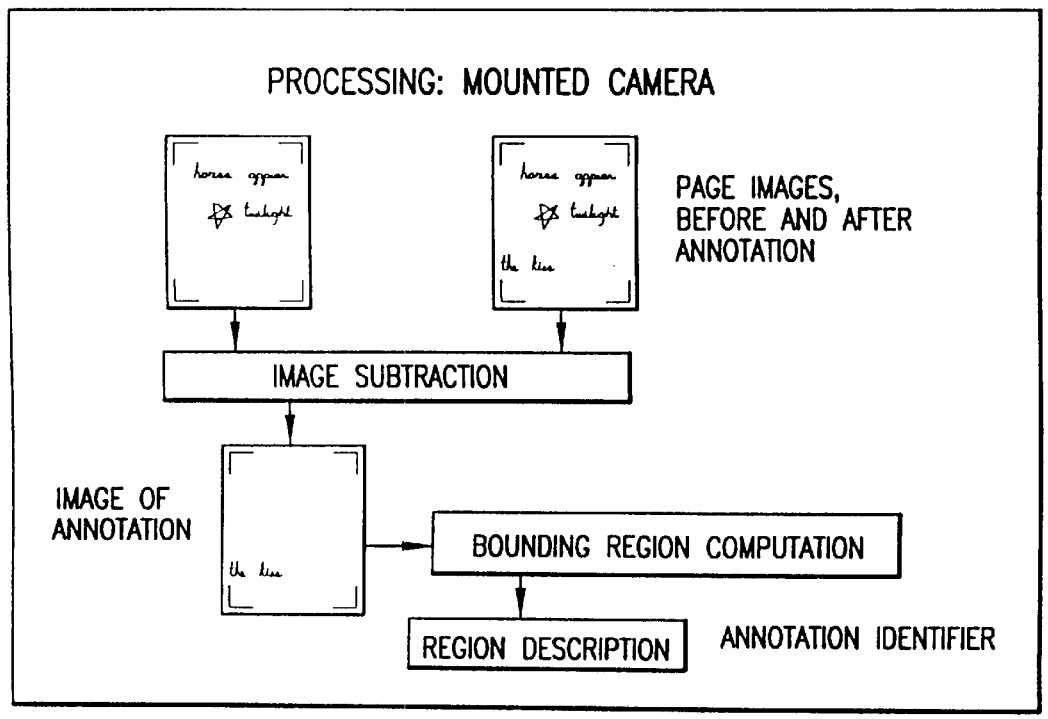
FIG. 9 is a schematic illustration of another way a position-based annotation identifier can be obtained in the system of FIG. 7.

FIG. 9 shows an example of operations that can be performed by the processing circuitry of FIG. 7 in this implementation. The camera provides an image signal set defining two images, referred to in FIG. 9 as page images before and after annotation. The processing circuitry can calibrate or register the two images using the registration marks in the corners. Then the processing circuitry can subtract the first image from the second to produce a third image containing only the current annotation. The processing circuitry can then perform a conventional bounding region computation to obtain a region description of a region that includes the annotation, and this region description can serve as an annotation ID.

The annotation ID obtained as in FIG. 9 can similarly be associated with a timestamp in a table or can be used for playback by finding a matching annotation ID in the table and by then using the associated timestamp to cause playback of a portion of the recording.

2.2 Identifying Annotations on Special-Purpose Pages

The invention can also be implemented with special purpose pages other than coded substrates. For example, an identifying feature of an annotation can be a number or other identifier that is encoded in machine-readable markings on the paper before the annotation is made. To perform annotation, a user can scan the markings that encode one of the identifiers, then write on the paper next to the scanned markings. The scanned markings can be decoded, and the number or other identifier can be stored in a pair with a timestamp of the recording.

For selection and retrieval during playback, the user can select an annotation by scanning the machine-readable markings next to it. The scanned markings can be decoded into a number, and the timestamp associated with that number in the table can be retrieved.

The machine-readable markings can be DataGlyphs or other appropriate markings that can encode the numbers or other identifiers.

Figure 10:
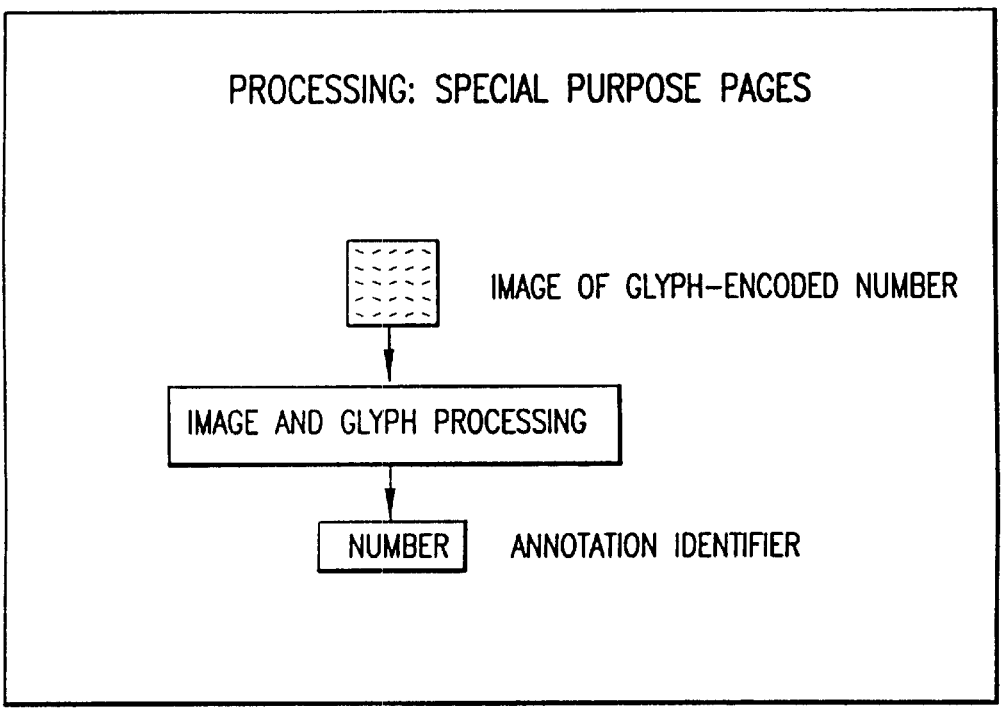
FIG. 10 is a schematic illustration of another way a position-based annotation identifier can be obtained in the system of FIG. 7.

FIG. 10 shows an example of operations that can be performed by the processing circuitry of FIG. 7 in this implementation.

The camera provides an image signal set defining an image showing a glyph-encoded number. The processing circuitry can process the image and decode the glyphs using conventional techniques like those used in Xerox's glyph toolkits, some of which have been referred to as SmartPaper, DAE, and DataGlyphs, to produce a number, which can serve as an annotation ID.

The annotation ID obtained as in FIG. 10 can similarly be associated with a timestamp in a table or can be used for playback by finding a matching annotation ID in the table and by then using the associated timestamp to cause playback of a portion of the recording.

2.3 Identifying Annotations by Shape Processing

The invention can also be implemented with annotation IDs based on shape feature information. For example, an annotation can be written on a page with pen or pencil and subsequently scanned. The shape of the annotation can identify the annotation. Arai, T., Aust, D., and Hudson, S. E., "PaperLink: A technique for hyperlinking from real paper to electronic content", *Proceedings of the ACM SigChi conference on Human Factors in Computing Systems,* ACM, March 1997, describe a technique to implement paper hyperlinks, some aspects of which can be used for this implementation. In this implementation, an annotation can be selected to control playback by scanning the annotation.

For example, when something interesting happens in a recording being made or played, a user can click to select the current point, and the system can obtain the timestamp. The user can then write a note. When the note is written, the user can scan it with a hand-held scanner. To control playback of the recording, the user can scan a note, and the system can obtain an annotation ID with information about shape features of the note. The annotation ID can be compared with annotation IDs in the table using an appropriate similarity criterion, and when a similar annotation ID is found, the system can retrieve the associated timestamp and use it to initiate playback of a portion of the recording.

The annotation ID for a note can, for example, be a scanned image of the note of a set of shape features extracted from the scanned image, and it can be associated with a timestamp as described in relation to the table in FIG. 7. When the user selects an annotation for playback, it can be compared to the stored images or shape features can be extracted and compared to the stored shape feature sets. The stored image or shape feature set that matches best can be determined with an appropriate similarity criterion, and the associated timestamp can be retrieved. Matching should be tractable and robust because there is a limited set of annotation IDs to match against. The similarity criterion can require, for example, that the annotation ID be the most similar of those available using an appropriate conventional metric of image or shape similarity.

In this implementation, although a user need not scan the entire note, either when taking notes or selecting them, what is scanned for selection should be approximately the same as what was scanned at the time of making the annotation.

Figure 11:
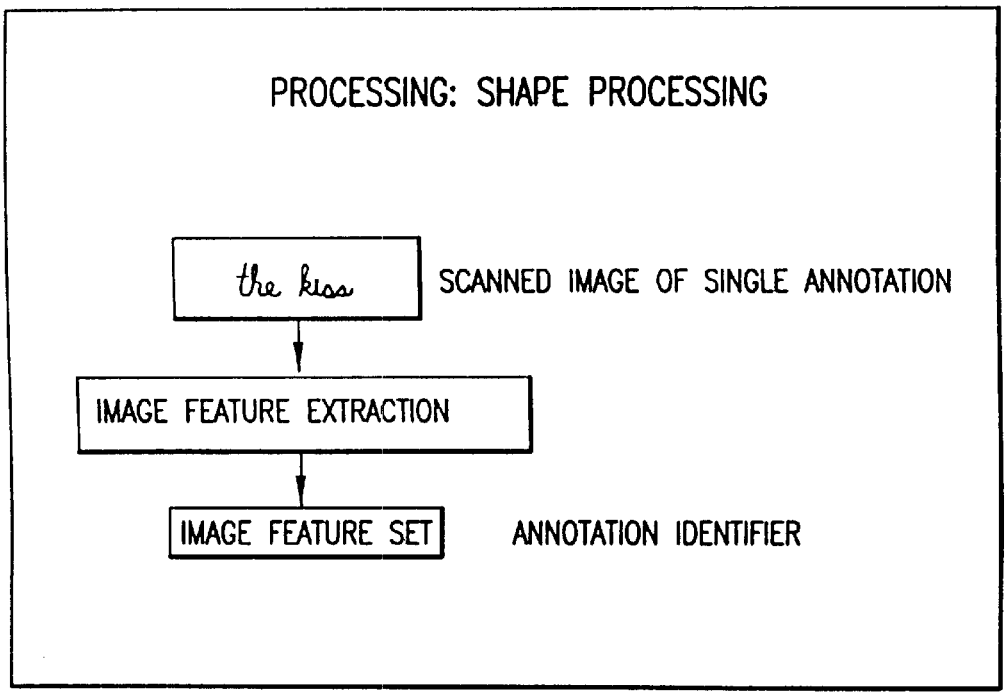
FIG. 11 is a schematic illustration of a way a shape-based annotation identifier can be obtained in the system of FIG. 7.

FIG. 11 shows an example of operations that can be performed by the processing circuitry of FIG. 7 in this implementation.

The camera provides an image signal set defining an image showing a single annotation. The processing circuitry can process the image using conventional image processing and feature extraction to produce a set of shape features for the image, which can serve as an annotation ID.

The annotation ID obtained as in FIG. 11 can similarly be associated with a timestamp in a table or can be used for playback by finding a matching annotation ID in the table and by then using the associated timestamp to cause playback of a portion of the recording.

2.4 Multiple Pages

The implementations described above can associate a given page of notes with a particular recording. If multiple pages of notes are taken, referring to multiple recordings, storing the association as a note/timestamp mapping, and identifying this aggregate structure by a document identifier could be useful, where the document identifier has a value that uniquely identifies the document. For example, coded substrates with page identifiers could be used, and the mounted camera implementation could also provide for page identification. Pre-marked special purpose pages as described above can also provide page identification if the numbers on each page are in a range that is distinct from those on other pages. For a shape processing implementation, a set of image features can serve to identify a page. The user can make an arbitrary mark on the page to identify it, then scan the mark. Collisions with similar marks on other pages are possible but could be detected and brought to the user's attention with an error message or the like.

2.5 Recording/Playback Devices

Audio and video recordings that provide timestamps are in widespread use, but the invention could be implemented with other recording and playback techniques and with indexing values that change over time other than timestamps. For example, if the user had a global positioning system (GPS) device whose values were accessible to the system, notes could be associated with locations and the recording made in a given location could be played back in response to selection of a note associated with that location.

3. Electronic Annotation and Paper Retrieval

In the above descriptions of implementations, a marking medium such as a sheet of paper was used both for annotation and playback. In other implementations of the invention, the user can take notes using an electronic user input device, and the notes can be printed so that playback can be controlled from a printed copy of the notes. As in the above implementations, a system can store for each note an identifier based on features of the note, associated with a timestamp. The choice of the features on which the identifier is based and the process of computing the identifier based on the features depends on the nature of the input.

3.1 ASCII and OCR

In one implementation, the annotations are input using a keyboard or other user input device that provides character codes such as ascii codes. The resulting ascii text can serve as an annotation ID and, for playback, can be printed in any fashion. A user can select an annotation from the printed copy by scanning the annotation with a hand-held scanner. OCR can be performed on the scanned text to recover the annotation ID. The annotation ID containing the most closely matching text can be identified using an appropriate similarity criterion, and its associated timestamp can be retrieved and used to control playback.

OCR accuracy can be improved by storing font information at the time the annotations are printed and then using it during OCR.

Figure 12:
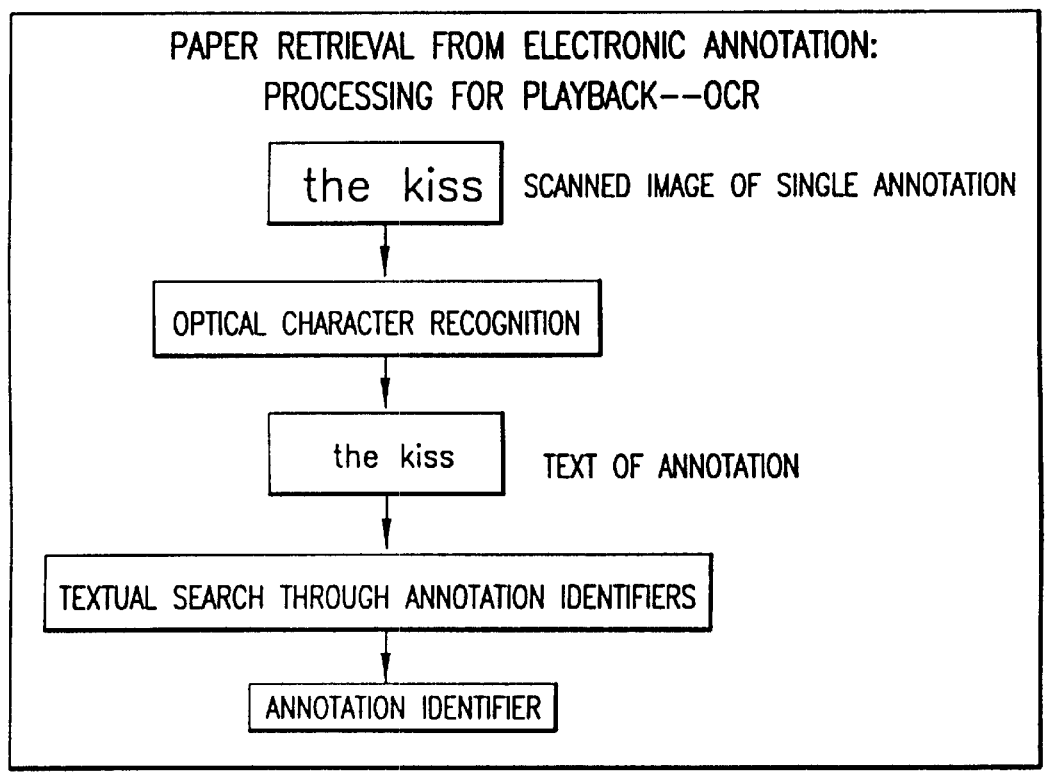
FIG. 12 shows a schematic illustration of a way in which retrieval can be performed in the system of FIG. 7.

FIG. 12 shows an example of operations that can be performed by the processing circuitry of FIG. 7 in this implementation.

The camera provides an image signal set defining an image showing a single annotation. The processing circuitry can process the image using conventional optical character recognition, producing a text. The processing circuitry can perform a textual search, comparing the text with the set of stored annotation identifiers, each of which is the text of an annotation, in this implementation, and chooses the closest match as the matching annotation ID.

The annotation ID obtained as in FIG. 12 can be used for playback by finding a matching annotation ID in the table and by then using the associated timestamp to cause playback of a portion of the recording.

3.2 Annotation ID Marks

In another implementation, when the annotations are printed, a machine-distinguishable mark or machine-readable markings encoding an identifier can be printed with each note, such as in the adjacent margin. The machine-distinguishable mark could be used as an annotation ID to retrieve an associated timestamp. Similarly, the machine-readable markings could be decoded to obtain a number or other identifier, which can be used to retrieve an associated timestamp. A user can select a note by hand-scanning the adjacent mark or marking, which can be recognized using appropriate techniques. Possible machine-readable markings include glyphs, bar codes, numbers or symbols in OCR fonts, icons, or text.

Figure 13:
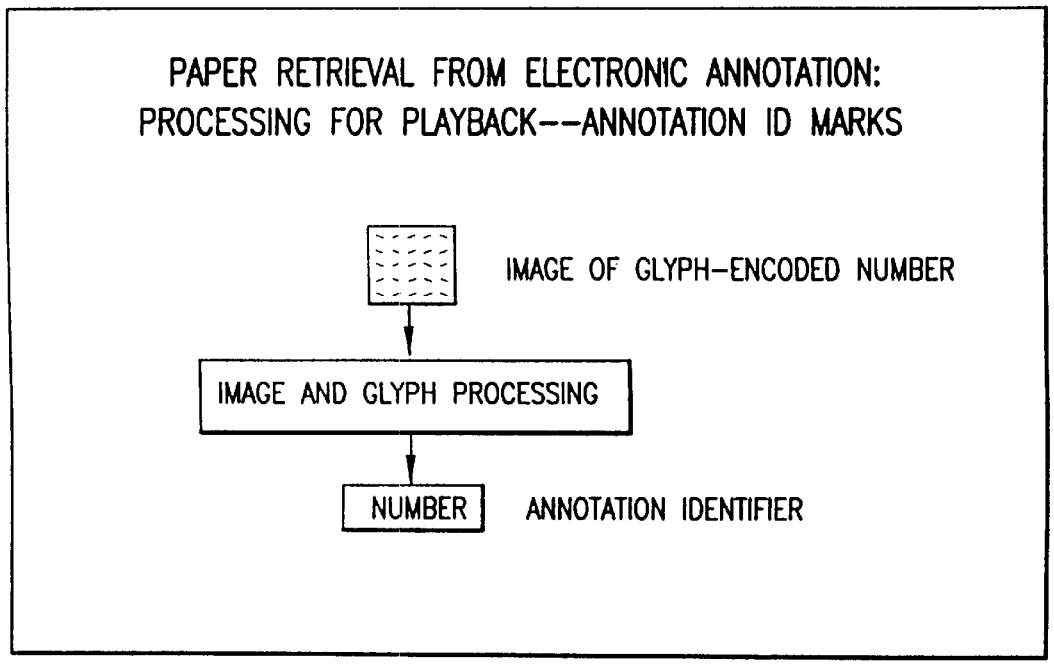
FIG. 13 is a schematic illustration of another way in which retrieval can be performed in the system of FIG. 7.

FIG. 13 shows an example of operations that can be performed by the processing circuitry of FIG. 7 in this implementation. FIG. 13 is similar to FIG. 10.

The camera provides an image signal set defining an image showing a glyph-encoded number. The processing circuitry can process the image and decode the glyphs using conventional techniques to produce a number, which can serve as an annotation ID.

The annotation ID obtained as in FIG. 13 can be used for playback by finding a matching annotation ID in the table and by then using the associated timestamp to cause playback of a portion of the recording.

3.3 Compatibility

In a system designed for taking notes electronically, either of the two above-described implementations could be used for selecting printed notes to control playback. But a system designed for taking notes on paper could be extended to allow notes to be taken electronically and printed. In this case, selection from paper should use the same mechanism as if the notes had been taken on paper, because the form of the annotation IDs must be compatible with the system for taking notes on paper.

4. Paper Annotation and Electronic Retrieval

The above-described techniques for paper annotation can be augmented in another implementation that allows retrieval and playback using an electronic user input device.

Figure 14:
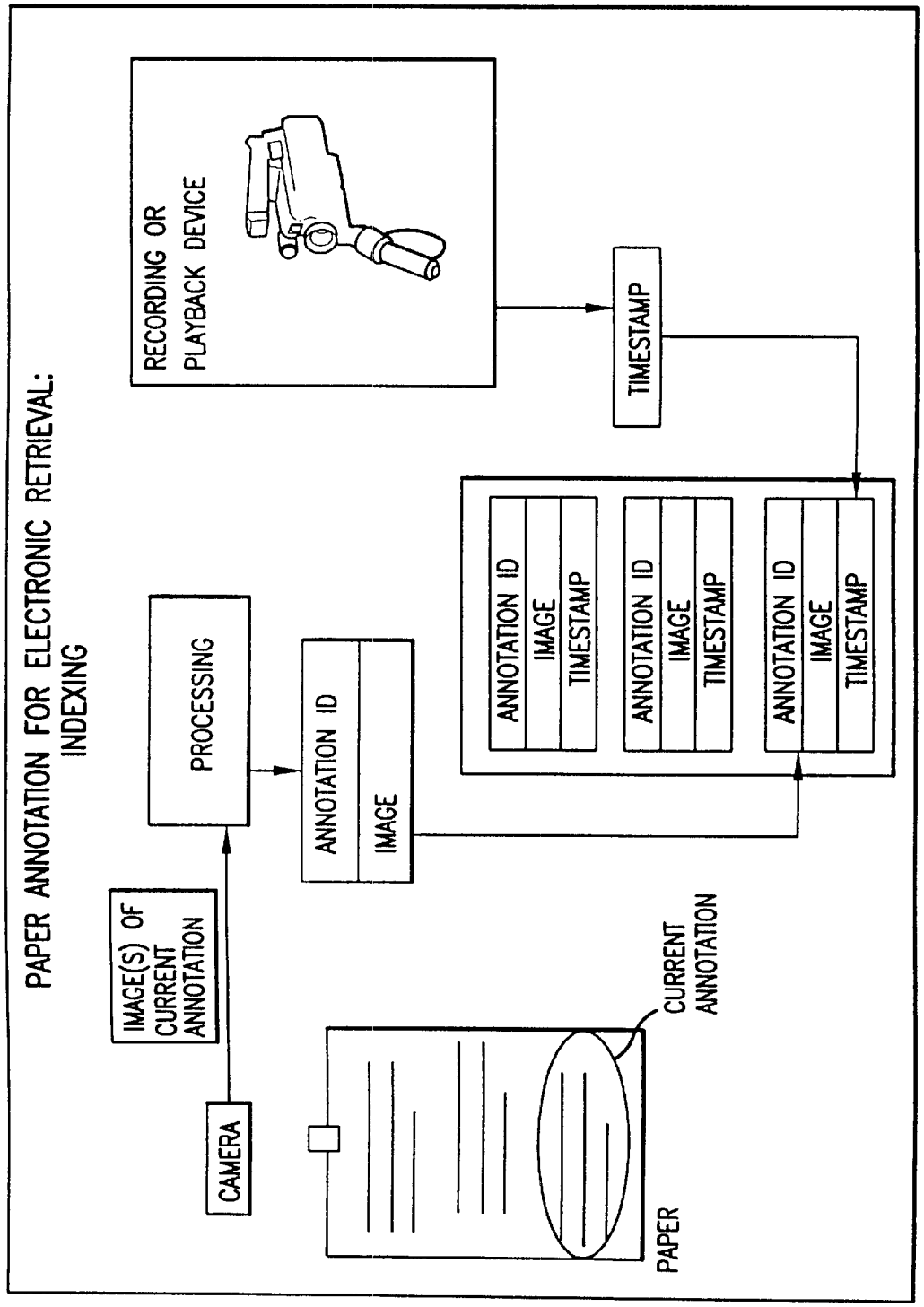
FIG. 14 is a schematic overview of another system for indexing recordings.

An overview of a system in which electronic retrieval and playback can be implemented is shown in FIG. 14. The elements are the same as in FIG. 7, with one addition— images of annotations are stored in the table with annotation IDs and timestamps. This allows a composite image substantially identical to the paper that the notes were written on, to be constructed and displayed for the user on a screen.

In an implementation in which the annotation ID includes position information, such as with a localization code (loc), when annotations are made, the image of the page can be stored. The final stored image can be displayed to a user. The user can position a pointing device such as a mouse relative to a page image frame to indicate an annotation's position just as position on paper could be indicated for retrieval purposes.

In an implementation in which the annotation ID is based on information obtained by hand-scanning, a display can be built from the various scanned notes. When the display is built, timestamps can be associated with regions of the display, so that a mouse can similarly be used for retrieval.

Figure 15:
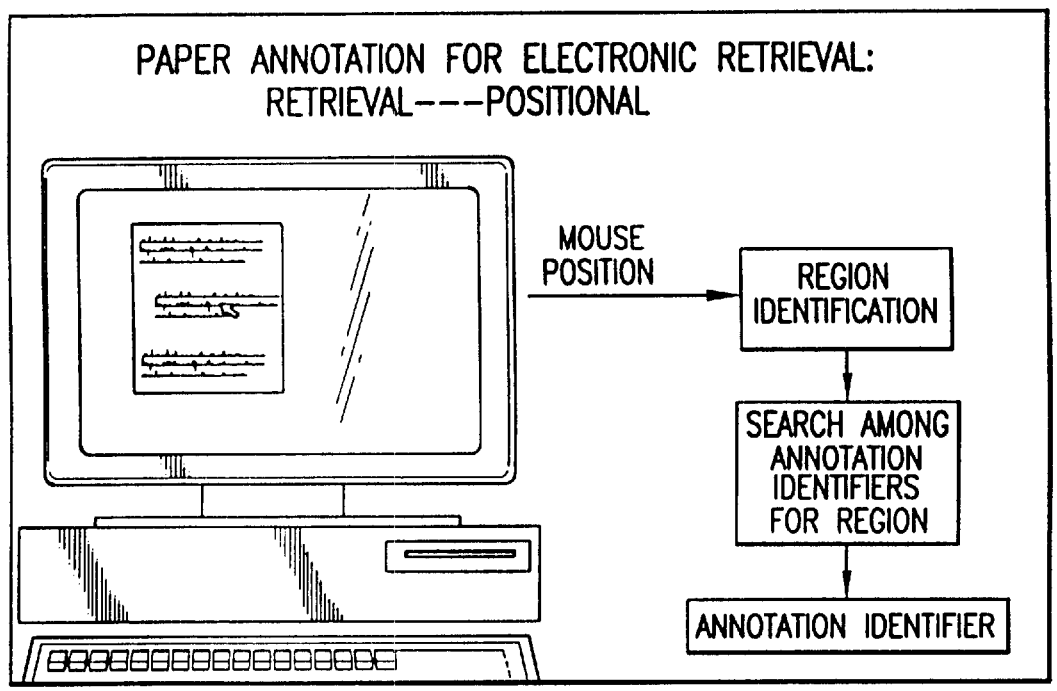
FIG. 15 is a schematic illustration of a way in which retrieval may be performed in the system of FIG. 14.

FIG. 15 shows an example of operations that can be performed by the processing circuitry of FIG. 14 for position-based retrieval. In retrieval by selecting annotations to control playback of an indexed recording, whether with coded substrates, a fixed camera, or another of the above implementations in which the annotation ID includes position information, the composite image described above can be displayed on a screen. A user can select an annotation by positioning a mouse-controlled pointer on some part of the annotation. Because regions in the composite image correspond to regions on the original marking medium on which notes were taken, the processing circuitry can use the mouse coordinates to obtain a region identifier and can then search for a stored annotation IDs identifying one of the regions that includes or is closest to the region identifier. The processing circuitry can then obtain the timestamp stored with the matching annotation ID and use it to control playback.

Figure 16:
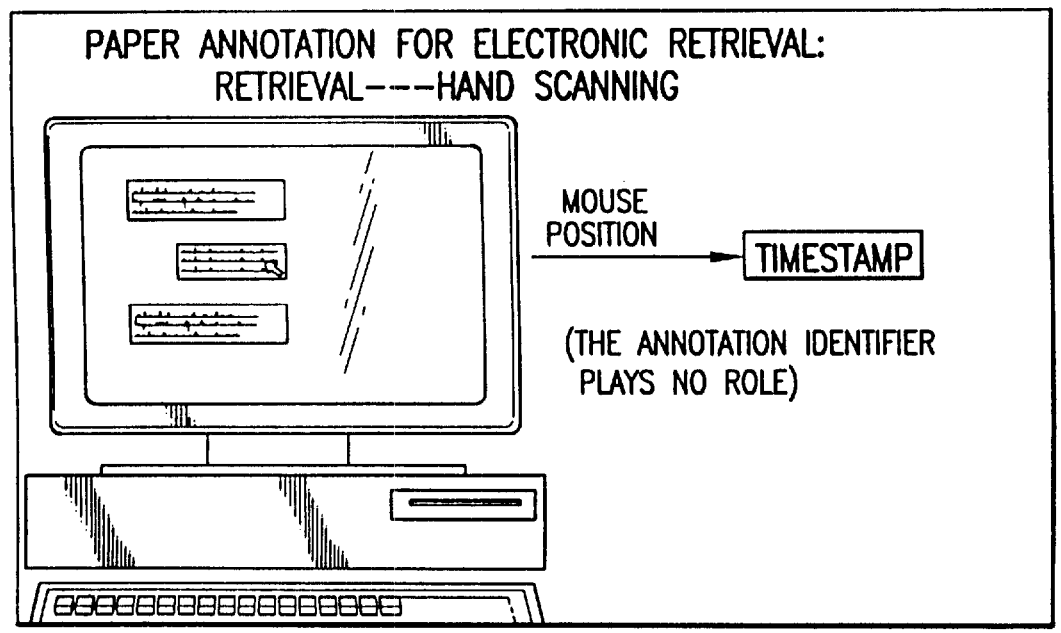
FIG. 16 is a schematic illustration of another way in which retrieval can be performed in the system of FIG. 14.

FIG. 16 shows an example of operations that can be performed by the processing circuitry in a hand-scanning implementation. In this case, timestamps can be associated directly with regions of the display when the composite image is built, so the processing circuitry can use the selected mouse position of an annotation directly to obtain an associated timestamp. This timestamp can be used to control playback.

Variations

The implementations described above could be varied in many ways within the scope of the invention.

The implementations described above use pointers that include cameras, fixed position cameras, and hand-held scanners to obtain image signals that include information about annotations, but any other appropriate image input circuitry could be used and various other techniques for distinguishing annotations from other portions of an image could be used.

The implementations described above use marking media that are sheets of paper, but any other appropriate marking media could be used.

The implementations described above use several kinds of annotation identifiers, including identifiers that include position information, identifiers that include shape information, identifiers that include text, but another other appropriate kind of information could be included in annotation identifiers. Also various other kinds of position information and shape information could be used.

The implementations described above use audio-video recording and playback devices, but various other recording/playback circuitry, both analog and digital, could be used with the invention.

The implementations described above use timestamps to index recordings, but other techniques for indexing recordings could be used.

The implementations described above employ a table that associates annotation identifiers with timestamps, but activity/recording data could take any other appropriate form, including any appropriate combination of hardware and software.

The implementations described above access an item of annotation/recording data based on various matching and similarity criteria, but any other such criteria that is appropriate to the annotation identifiers being compared could be used.

It will be appreciated that the techniques described herein may also be used in conjunction with the related techniques described in coassigned U.S. Pat. No. 6,330,976, entitled "Marking Medium Area With Encoded Identifier for Producing Action Through Network", and U.S. Pat. No. 6,345,304 entitled "Obtaining Network Addresses from Identifiers", both incorporated herein by reference.

In implementations described above, specific acts are performed that could be omitted or performed differently.

In implementations described above, acts are performed in an order that could be modified in some cases.

Implementations described above use currently available computing techniques, but could readily be modified to use newly discovered computing techniques as they become available.

Applications

The invention could be applied in various ways.

As suggested above, the invention could be applied to provide indexing into an audio-video recording.

Also, the invention could be applied to recordings of times relating to a ship's log or to news reporting. In these applications, handwritten paper notes may be timestamped without respect to an explicit recording other than the recording of times.

Also, the invention could be applied to recordings of laboratory experiment measurements, telescope parameters, surgery-room parameters, or meteorological condition measurements. In these applications, handwritten paper notes may be time-correlated with instrumentation logs, or parameter values could be directly associated with notes. In this case, a specialized application could provide an interface to the instrument.

Miscellaneous

Although the invention has been described in relation to various implementations, together with modifications, variations, and extensions thereof, other implementations, modifications, variations, and extensions are within the scope of the invention. The invention is therefore not limited by the description contained herein or by the drawings, but only by the claims.

What is claimed is:

1. A method for obtaining data associating manual annotating activities with portions of recordings, the method comprising:

using an image input device to produce an image signal set, the image signal set defining a set of one or more images that include information about a manual annotating activity that occurs during a period of time within which a portion of a recording is made or played;

using a recording/playback device to obtain a recording portion signal providing information about the portion of the recording; and using the image signal set and the recording portion signal to automatically obtain activity/recording data that associate information about the manual annotating activity with information identifying the portion of the recording;

in which the manual annotating activity is performed in a region of a marking medium that bears machine-readable markings encoding a position identifier for the region; the machine-readable markings existing in the region of the marking medium before the manual annotating activity is performed; and in which the image signal set defines a set of one or more images of the region of the marking medium; the act of using the image signal set and the recording portion signal to automatically obtain activity/recording data comprising:

using the image signal set to obtain position data indicating the position identifier.

2. The method of claim 1 in which the marking medium has two or more zones, each bearing machine-readable markings that encode a position identifier indicating the position of the zone within the page; the manual annotating activity being performed in one of the zones; the image signal set defining an image of the zone that includes the machine-readable markings that encode the zone's position identifier.

3. The method of claim 1 in which the machine readable markings encode a position identifier for the position of the machine readable markings and the manual annotating activity is performed next to the machine readable markings; the image signal set defining an image of the machine readable markings.

4. The method of claim 1 in which the act of using the image signal set and the recording portion signal to automatically obtain activity/recording data comprises:

using the image signal set to obtain an identifier of the manual annotating activity; the activity/recording data including a pair of items of data, the pair including the identifier of the manual annotating activity and an identifier of the portion of the recording.

5. The method of claim 4 in which the act of receiving a recording portion signal comprises:

receiving, during the period of time within which the manual annotating activity is performed and the portion of the recording is made or played, a time selection signal from a user selecting a time within the period; and obtaining, in response to the time selection signal, a timestamp indicating the time within the recording that corresponds to the selected time; the timestamp being the identifier of the portion of the recording.

6. The method of claim 1, further comprising printing the machine-readable markings on the marking medium.

7. The method of claim 6, wherein the machine-readable markings printed on the marking medium are visible or invisible.

8. The method of claim 7, wherein the marking medium is paper.

9. A method for obtaining data associating manual annotating activities with portions of recordings, the method comprising:

using an image input device to produce an image signal set, the image signal set defining a set of one or more images that include information about a manual annotating activity that occurs during a period of time within which a portion of a recording is made or played; the manual annotating activity being performed on a marking medium; the image signal set defining a set of one or more images of the marking medium;

using a recording/playback device to obtain a recording portion signal providing information about the portion of the recording; and using the image signal set and the recording portion signal to automatically obtain activity/recording data that associate information about the manual annotating activity with information identifying the portion of the recording;

in which the manual annotating activity being performed on a marking medium; the image signal set defining a set of one or more images of the marking medium; and in which the manual annotating activity is performed at a position of the marking medium and the image signal set defines a before image showing the marking medium before the manual annotating activity and an after image showing the marking medium after the manual annotating activity; the act of using the image signal set and the recording portion signal to automatically obtain activity/recording data comprising:

comparing the before image and the after image to obtain position data indicating the position at which the manual annotating activity is performed.

10. A system for obtaining and using data associating manual annotating activities with portions of recordings, the system comprising:

recording/playback circuitry for making or playing recordings;

an image input circuitry for providing image signals defining images; and processing circuitry connected for receiving image signals from the image input circuitry and connected for receiving information about a recording being made or played by the recording/playback circuitry; the processing circuitry operating to:

receive an image signal set from the image input circuitry, the image signal set defining a set of one or more images that include information about a manual annotating activity that occurs during a period of time within which a portion of a recording is made or played;

receive a recording portion signal from the recording/playback circuitry providing information about the portion of the recording; and using the image signal set and the recording portion signal to automatically obtain activity/recording data that associate information about the manual annotating activity with information identifying the portion of the recording;

in which the processing circuitry is further connected for causing the recording/playback circuitry to play back portions of the recording; the processing circuitry further operating to:
  receive a second image signal set from the image input circuitry; the second image signal set providing information about a manual request activity;
  use the second image signal set to automatically obtain activity data that include information about the manual request activity;
  if the information about the manual request activity and the information about one of the manual annotating activities meets a similarity criterion, use the activity data and the activity/recording data to obtain portion identifying data identifying the portion of the recording associated with the manual annotating activity; and
  use the portion identifying data to provide a portion playback signal to the recording/playback circuitry causing playback of the portion of the recording.

11. The system of claim 10 in which the activity/recording data include an annotation identifier and a timestamp, the system further comprising:
  a table containing pairs of items of data; each pair including an annotation identifier and a timestamp;
  the processing circuitry further operating to store the activity/recording data in the table.

12. The system of claim 11 in which the manual annotating activity produces an annotation; the image signal set defining an image of the annotation; the table further containing, for each pair, annotation image data defining the image of the annotation.

13. The system of claim 10 in which the manual annotating activity produces an annotation; the system further comprising user selection circuitry for providing selection signals indicating annotations selected by a user; the processing circuitry being connected for receiving the selection signals and for causing the recording/playback circuitry to play back portions of the recording; the processing circuitry further operating to:
  receive a selection signal indicating one of the annotations from the user selection circuitry;
  use the selection signal and the activity/recording data to obtain portion identifying data identifying the portion of the recording associated with the manual annotating activity; and
  use the portion identifying data to provide a portion playback signal to the recording/playback circuitry causing playback of the portion of the recording.

14. A method for using activity/recording data associating annotating activities with portions of recordings to play back portions of recordings, the method comprising:
  using an image input device to produce an image signal set, the image signal set defining a set of one or more images of a marking medium that include information about a manual activity relating to the marking medium;
  using the image signal set to automatically obtain activity data including information about the manual activity;
  using the activity data and the activity/recording data to obtain portion identifying data identifying a portion of the recording; the activity/recording data associating information about an annotating activity with the identified portion of the recording; the information about the manual activity included in the activity data and the information about the annotating activity meeting a similarity criterion; and
  using the portion identifying data to provide a portion playback signal to playback circuitry causing playback of the identified portion of the recording;
  in which the manual activity is performed in a region of the marking medium that bears machine-readable markings encoding a position identifier for the region and the image signal set defines a set of one or more images of the region of the marking medium; the machine-readable markings existing in the region of the marking medium before the manual activity is performed; the act of using the image signal set to automatically obtain activity data comprising:
    using the image signal set to obtain position data indicating the position identifier.

15. The method of claim 14 in which the marking medium has two or more zones, each bearing machine-readable markings that encode a position identifier indicating the position of the zone within the page; the manual annotating activity being performed in one of the zones; the image signal set defining an image of the zone that includes the machine-readable markings that encode the zone's position identifier.

16. The method of claim 14 in which the machine readable markings encode a position identifier for the position of the machine readable markings and the manual activity is performed next to the machine readable markings; the image signal set defining an image of the machine readable markings.

17. The method of claim 14 in which the act of using the image signal set to automatically obtain activity data comprises:
  using the image signal set to obtain an identifier of the manual activity, the activity data including the identifier; the activity/recording data including pairs of items of data, each pair associating an identifier of a manual activity and an identifier of a portion of the recording;
  the act of using the activity data and the activity/recording data to obtain portion identifying data comprising:
    comparing the identifier in the activity data with identifiers in the activity/recording data to find a match; and
    upon finding a match, obtaining the associated identifier of a portion of the recording, the portion identifying data including the identifier of the portion.

18. The method of claim 14 in which the annotating activities are input of text by a keyboard; the marking medium bearing a printed version of the text input by each of the annotating activities; the image input circuitry comprising a hand-held scanner; the manual activity including holding the hand-held scanner to scan the printed version of the text input by one of the annotating activities; the image signal set defining an image of the scanned text input; the act of using the image signal set to automatically obtain activity data comprising:
  performing optical character recognition on the image of the scanned text input to obtain recognized text.

19. The method of claim 14 in which the annotating activities produce annotations; the marking medium bearing a printed image of the annotations and, with each annotation, machine-readable markings encoding an identifier of the annotation; the image input circuitry comprising a hand-held scanner; the manual activity including holding the hand-held scanner to scan the machine-readable markings with one of the annotations; the image signal set defining an image of the scanned machine-readable markings; the act of using the image signal set to automatically obtain activity data comprising:
  using the image of the scanned machine-readable markings to obtain data indicating the identifier of the annotation.

20. The method of claim 14, further comprising printing the machine-readable markings on the marking medium.

21. The method of claim 20, wherein the machine-readable markings on the marking medium are visible or invisible.

22. The method of claim 21, wherein the marking medium is paper.

23. A method for using activity/recording data associating annotating activities with portions of recordings to play back portions of recordings, the method comprising:

using an image input device to produce an image signal set, the image signal set defining a set of one or more images of a marking medium that include information about a manual activity relating to the marking medium;

using the image signal set to automatically obtain activity data including information about the manual activity;

using the activity data and the activity/recording data to obtain portion identifying data identifying a portion of the recording; the activity/recording data associating information about an annotating activity with the identified portion of the recording; the information about the manual activity included in the activity data and the information about the annotating activity meeting a similarity criterion; and using the portion identifying data to provide a portion playback signal to playback circuitry causing playback of the identified portion of the recording;

in which the manual activity is performed at a position of the marking medium and the image signal set defines a before image showing the marking medium before the manual activity and an after image showing the marking medium after the manual activity; the act of using the image signal set to automatically obtain activity data comprising:

comparing the before image and the after image to obtain position data indicating the position at which the manual activity is performed.

\* \* \* \* \*